(12) United States Patent
Caban

(10) Patent No.: US 12,146,306 B2
(45) Date of Patent: Nov. 19, 2024

(54) WIRELESS WATER CONTROL SYSTEM OF ELECTRONIC FAUCETS OR WATER OUTLETS

(71) Applicant: Marlena Caban, Fort Lee, NJ (US)

(72) Inventor: Marlena Caban, Fort Lee, NJ (US)

( * ) Notice: Subject to any disclaimer, the term of this patent is extended or adjusted under 35 U.S.C. 154(b) by 554 days.

(21) Appl. No.: 17/468,782

(22) Filed: Sep. 8, 2021

(65) Prior Publication Data

US 2022/0074175 A1 Mar. 10, 2022

Related U.S. Application Data

(60) Provisional application No. 63/075,766, filed on Sep. 8, 2020.

(51) Int. Cl.
| | | |
|---|---|---|
| *E03C 1/044* | (2006.01) | |
| *E03C 1/02* | (2006.01) | |
| *E03C 1/04* | (2006.01) | |
| *F24D 19/10* | (2006.01) | |
| *G01K 3/00* | (2006.01) | |
| *G01M 3/00* | (2006.01) | |
| *G05B 19/4155* | (2006.01) | |
| *G05D 7/06* | (2006.01) | |
| *G05D 23/19* | (2006.01) | |
| *G10L 13/08* | (2013.01) | |
| *G10L 15/22* | (2006.01) | |

(52) U.S. Cl.
CPC .......... *E03C 1/044* (2013.01); *F24D 19/1051* (2013.01); *G01K 3/005* (2013.01); *G05B 19/4155* (2013.01); *G05D 7/0617* (2013.01); *G05D 23/19* (2013.01); *G10L 13/08* (2013.01); *G10L 15/22* (2013.01); *E03C 2001/026* (2013.01); *E03C 2001/0418* (2013.01); *G01M 3/00* (2013.01); *G05B 2219/50333* (2013.01)

(58) Field of Classification Search
USPC ........................................................ 700/300
See application file for complete search history.

(56) References Cited

U.S. PATENT DOCUMENTS

| | | |
|---|---|---|
| 8,127,782 B2 | 3/2012 | Jonte et al. |
| 8,572,772 B2 | 11/2013 | Wolf et al. |
| 11,047,761 B1 * | 6/2021 | Frackelton .......... G01M 3/2815 |

(Continued)

*Primary Examiner* — Md Azad
*Assistant Examiner* — Md Abul Azad
(74) *Attorney, Agent, or Firm* — Boudwin Intellectual Property Law, LLC; Daniel Boudwin

(57) ABSTRACT

A wireless water control system includes a water heater connected to a water supply, a water line sensor device connected to a water line in fluid communication with the water heater, a wireless flow control valve connected to the water line, and at least one outlet faucet in fluid communication with the water line. The components are in wireless communication via a shared wireless network such as a Bluetooth connection. The control circuit receives user information including one or more parameters from an external device via the wireless network. The control circuit wirelessly activates the outlet faucet via a command sent through the wireless network, such that the outlet faucet emits water in a manner corresponding to the received user information. The outlet faucet also includes a speaker and microphone which facilitates voice activation. The speaker can emit music, text-to-speech for written information received from the internet, and other sounds.

11 Claims, 3 Drawing Sheets

(56) References Cited

U.S. PATENT DOCUMENTS

| | | | |
|---|---|---|---|
| 11,466,869 B1* | 10/2022 | Clark | F24D 19/1063 |
| 2006/0168611 A1* | 7/2006 | Fima | F24H 15/212 |
| | | | 141/192 |
| 2007/0261161 A1 | 11/2007 | Avigdor | |
| 2016/0129464 A1 | 5/2016 | Frommer | |
| 2017/0260722 A1 | 9/2017 | Horwitz et al. | |
| 2018/0127957 A1* | 5/2018 | Enev | G01M 3/2815 |
| 2018/0148912 A1* | 5/2018 | Park | E03C 1/055 |
| 2020/0299941 A1* | 9/2020 | Veros | G10L 15/22 |

* cited by examiner

WIRELESS WATER CONTROL SYSTEM OF ELECTRONIC FAUCETS OR WATER OUTLETS

CROSS REFERENCE TO RELATED APPLICATIONS

This application claims the benefit of U.S. Provisional Application No. 63/075,766, filed on Sep. 8, 2020. The above identified patent application is herein incorporated by reference in its entirety to provide continuity of disclosure.

BACKGROUND OF THE INVENTION

The present invention relates to water distribution and control systems. More particularly, the present invention provides a wirelessly controllable and programmable water distribution system for a dwelling.

Water has many essential uses within a home or other dwelling. Water outlets within a dwelling often include a combination of sinks, bathtubs or showers, and outdoor faucets. These water outlets provide water to individuals for different purposes. The water outlets sometimes include the ability to adjust the temperature of the water. Despite the many advantages the home water system provides, it is not without its drawbacks and requires modern improvements. For example, home water systems can become damaged over time. Water heaters, pipes, and other components can be prone to leaks. Other damages can occur without warning and may cause damage to the building. An individual typically has no way to be notified if there is a leak or other problem in their water system. Further, beyond their monthly water bill, most individuals do not have a way to monitor water usage, particularly at the different outlets that the water can flow through. Without the ability to track water usage over time, water can be wasted, and the water bill can quickly increase in cost.

Additionally, while some individuals may leave water running for too long, other individuals may not use enough water to properly conduct certain tasks. Some users may not use enough time or water when brushing their teeth, washing their hands, or performing other hygiene tasks. For example, washing the hands for more than twenty seconds is important for properly sanitizing the hands and preventing the spread of germs and bacteria. As another example, dentists recommend individuals brush their teeth for at least two minutes for proper care of the teeth. The lack of a timing mechanism means a user must guess how long they are running the water or performing a related action, unless they use an external timing device, which can be time consuming and inconvenient.

Some individuals have their own preferences for their water temperature, water pressure, shower timing, and the like. With typical water systems and faucets, these parameters must be adjusted manually by each user each time the water outlet is utilized. This can be time consuming, and it can be difficult to replicate exact settings between uses. Some individuals may accidentally burn or otherwise injure themselves by accidentally adjusting the water outlet temperature to an unsafe temperature. In order to address these concerns and the other issues discussed above, the present invention provides a wireless water control system that has multiple types of programmable water outlets which can monitor and control water usage through an entire dwelling or building.

Devices have been disclosed in the known art that relate to wirelessly controllable and programmable water systems. These include devices that have been patented and disclosed in patent application publications. However, the devices in the known art have several drawbacks. For example, these devices are typically only a single sink or other outlet and do not provide a mechanism for controlling and monitoring overall water usage within the home. Further, these devices often lack the capability to be programmed by individual users to suit their individual preferences, such that pressure, temperature, and other settings can be automatically recalled and applied between uses. The devices in the known art also safety features that automatically notify users of unsafe water temperatures, leaks, or other potentially damaging or dangerous faults in the home water system.

SUMMARY OF THE INVENTION

The present invention provides a wireless water control system wherein the same can be utilized for providing a temperature-controlled and time-controlled water flow at different types of outlets. The wireless water control system generally includes a water heater operably connected to a water supply. A water line sensor device operably connected to a water line that is in fluid communication with the water heater includes a pressure sensor, a leak detection sensor, a temperature sensor, a wireless transceiver, and a power source. A wireless flow control valve operably connected to the water line, which allows users to automatically shut down water flow to prevent excess damage in the event of a leak or other problem with the water lines.

The system further includes at least one outlet faucet in fluid communication with the water line. The outlet faucet includes a speaker, a display screen, a power source, a wireless transceiver, a flow adjustment mechanism, a flow rate sensor, and a temperature sensor. The outlet faucet, the control circuit, the water line sensor device, and the wireless flow control are in wireless communication via a shared wireless network. A control circuit operably connected to the water heater includes a wireless transceiver, a processer, a non-transitory computer readable medium operatively connected to the processor, and a logic stored in the non-transitory computer readable medium that, when executed by the processor, causes the stroller to perform a method. The method includes receiving user information including one or more parameters from an external device via the wireless network. The parameters include at least a flow rate, a flow pressure, a flow temperature, and a flow time. The control circuit wirelessly activates the outlet faucet via a command control through the wireless network, such that the outlet faucet emits water at a flow rate, a flow pressure, a flow temperature, and for a flow time according to the received user information. In this way, the outlet faucet's activity can be customized by the user to suit their individual preferences.

One object of the present invention is to provide a wireless water control system that can be utilized with different types of water outlets within the dwelling, include bathtubs or showers, sinks, and outdoor faucets, as some examples.

Another object of the present invention is to provide a wireless water control system that includes automatic safety features that control water temperature to prevent injury.

A further object of the present invention is to provide a wireless water control system that monitors overall water consumption in order to improve water usage efficiency over time.

Another object of the present invention is to provide a wireless water control system having a water outlet with an electronic dispenser, wherein the electronic dispenser can be controlled remotely via the control circuit and be part of the one or more user parameters supplied to the outlet faucet.

Still a further object of the present invention is to provide a wireless water control system having an outlet faucet with a microphone and speaker for providing voice activation capabilities, as well as text-to-speech information received from the internet. The voice activation capabilities can include artificial intelligence software to analyze voice commands and retrieve information from the internet accordingly. The speaker can also be utilized to play music, emit reminders for calendared events, or play or other audio files via the Bluetooth connection.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
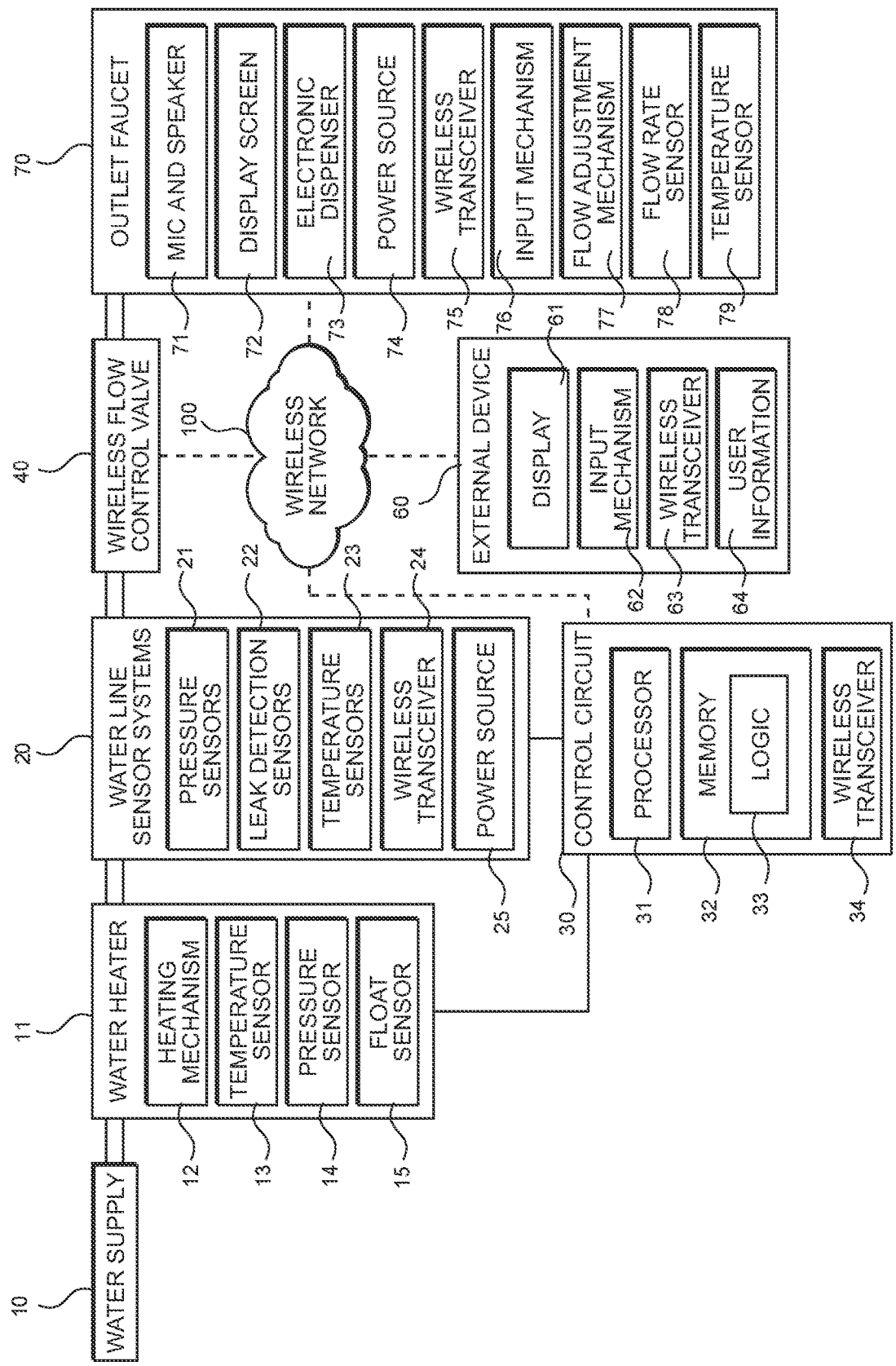
FIG. 1 shows a block diagram of the components of an embodiment of the wireless water control system.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

Reference is made herein to the attached drawings. Like reference numerals are used throughout the drawings to depict like or similar elements of the wireless water control system. For the purposes of presenting a brief and clear description of the present invention, a preferred embodiment will be discussed as used for providing a wirelessly controllable and programmable water distribution system for a dwelling that can be customized with individual user settings for different applications. The figures are intended for representative purposes only and should not be considered to be limiting in any respect.

Referring now to FIG. 1, there is shown a block diagram of the components of an embodiment of the wireless water control system. The overall water system can be within a home, dwelling, or any other building. A water supply 10 enters the building and connects to a water heater 11. The water heater 11 includes a heating mechanism 12, a temperature sensor 13, a pressure sensor 14, and a float sensor 15, as well as other components. The water heater's output pipe connects to a system of hot water lines, which run typically adjacent to cold water lines, since most output faucets will have a hot and cold tap.

The hot and cold water lines are monitored by a plurality of water line sensor systems 20. The water line sensor systems can be made up of multiple individual devices that are installed at various locations along the length of a hot or cold water line. The water line sensor system 20 includes a combination of pressure sensors 21, leak detection sensors 22, and temperature sensors 23 to monitor the status of the hot and cold water lines. The pressure sensors 21 can be utilized to detect unsafe high pressure levels, or to detect a sudden loss in pressure that would indicate a damaged hot or cold water line. The leak detection sensors 22 can include moisture sensors on the exterior of the hot and cold water lines, as one example. The temperature sensors 23 are utilized to detect unsafe water temperatures, whether it be pipes that are close to freezing or water that is too hot, for example. The water line sensor system 20 also includes a power source 25 which may be a wired connection to an outlet or a rechargeable battery. A wireless transceiver 24 allows the water line sensor system 20 to wirelessly transmit pressure, temperature, leak detection, and other data via a wireless network, such as an internet connection, a wireless local area network, a Bluetooth connection, or via any other suitable wireless communication protocols.

The water heater 11 and the water line sensor systems 20 are operably connected to a control circuit 30, which may be disposed within a master control panel installed with the building, or may be otherwise contained in a remote location. The water heater 11 can and the water line sensor systems 20 can include a wired or wireless connection to the control circuit 30. The control circuit includes a processor 31, a non-transitory computer readable storage mechanism such as a memory 32, and a logic 33 stored on the memory. The logic 33 includes programming instructions for carrying out the various functions of the present invention. A wireless transceiver 34 receives programming information remotely via a wireless network 100. An external device 60 such as a smartphone or other similar device can be utilized to program the control circuit 30, and to receive notifications and other data from the control circuit 30. The external device 60 is able to connect to the overall system or individual outlet faucets via a Bluetooth connection.

The external device 60 preferably includes a display 61 and an input mechanism 62 such as a touch screen, keyboard, or the like, for viewing and sending information. The external device 60 includes stored user information 64 that is utilized to create specific control circuit programming instructions for the individual user. In some embodiments, the stored user information 64 can be contained on a remote database server for access by the control circuit 30, and can be copied into the memory 32 of the control circuit 30 as needed. The wireless network 100 is also utilized for the control circuit 30 to control one or more wireless flow control valves 40. This can be a master shutoff valve for the building's water supply, or it can be individual shutoff valves located at each outlet faucet 70 of the present invention.

The system includes a plurality of outlet faucets 70 that are connected to and distribute water from the hot and cold water lines. The outlet faucets 70 can take the form of any typical water outlet in a building. For example, the outlet faucet 70 can be a sink faucet, a tub faucet, a shower faucet, an outdoor hose faucet, or any other type of faucet for dispensing water for use in or around the building. The present invention is intended to encompass any potential use for water within the building.

Each outlet faucet 70 includes a microphone and speaker 71, a display screen 72, a power source 74, a wireless transceiver 75, an input mechanism 76, a flow adjustment mechanism 77, a flow rate sensor 78, and a temperature sensor 79. The display screen 72 can display information such as temperature settings, pressure settings, current temperatures or pressures, or other useful information. The input mechanism 76 can be utilized to override the control circuit 30 and directly control the outlet faucet 70 operation, or to input new program instructions.

Further, the microphone and speaker 71 can provide a mechanism for voice activated control of the outlet faucet. To facilitate such control, the logic 33 stored in the memory 32 includes mechanisms for interpreting user speech and either changing the outlet faucet 70 parameters or retrieving requested information via the wireless network 100. For example, a user may conduct an internet search via voice activation with the outlet faucet 70 microphone 71. The logic 33 also includes text-to-speech mechanisms which allow written information received from the network 100 to be communicated audibly to the user.

The speaker 71 can also be utilized to emit any desired audio from the connected external device 60. As one example, the speaker can play music streamed via a bluetooth connection between the external device 60 and the wireless transceiver 75 of the outlet faucet 70. As another example, the speaker 71 can emit notifications, alarms, reminders, and other alerts that are generated via the wirelessly connected external device 60. The text-to-speech mechanism of the logic 33 can interpret written information stored on the external device, such as a calendar reminder for example, and emit the information as an audible description and event reminder for the user.

The flow adjustment mechanism 77 of the outlet faucet 70 includes valves and other components that can adjust the output pressure of the water. The flow rate sensor 78 monitors overall water use at the particular outlet faucet 70. The temperature sensor 79 monitors current water temperature and can detect unsafe temperature levels. The outlet faucet 70, the control circuit 30, the water line sensors 20, and the wireless flow control valves 40 are in wireless communication via a shared wireless network, allowing the external device 60 to send programming instructions to the control circuit 30, which can then control the connected systems. The speaker 71 can be utilized to play an audio file received from the external device 60 In some embodiments, the outlet faucet 70 also includes an electronic dispenser 73 which can be programmed via the control circuit 30 to dispense soap or other materials in desired quantities or intervals.

In operation, the control circuit 30 receives user information 64 remotely from the external device 60 via the wireless network 100. The user information 64 includes one or more parameters such as a flow rate, a flow pressure, a flow temperature, and a flow time, for example. This allows users to program specific faucets for different desired uses. As one example, an individual may have a different set of parameters for morning or nighttime showers, such that the pressures, timing, and temperatures are different for each. This also allows individual users to input their own information so that settings can be recalled with ease. The control circuit 30 activates the outlet faucet 70 via a command control through the wireless network 100, and the outlet faucet 70 emits water at a flow rate, a flow pressure, a flow temperature, and for a flow time according to the user information 64.

The control circuit 30 also provides safety monitoring features by communicating notifications of particular detected events to the external device 60 via the wireless network 100. For example, if the leak detection sensor of the water line sensor 20 detects a leak, then the water line sensor 20 transmits the information to the control circuit 30, which then transmits a notification to the external device 60. The control circuit 30 can also close the wireless flow control valve 40 to prevent further damage from the leak. In another example, if any of the temperature sensors of the water line sensor device 20 or the outlet faucet 70 detects a temperature outside of an acceptable safe temperature range, then the control circuit 30 can automatically activate or deactivate the heating mechanism 12 of the water heater 10 to bring the water temperature within the acceptable temperature range. A notification can also be sent if the water line temperature sensor 23 detects frozen or close to freezing pipes. Additionally, the pressure sensors 21 and flow rate sensors 78 can be utilized to measure the amount of water being used in the building overall, or at each outlet faucet 70. Notifications can be sent to the external device 60 to notify the user of excessive water use, helping them to use water more efficiently and reduce their monthly water bill. In another example, the control circuit 30 can be utilized to notify users of water heater issues. If the water heater float sensor 15 detects a level outside of an acceptable water level range, the system can transmit a notification to the external device 60. If other issues are detected via the temperature or pressure sensors 13, 14, these can be communicated as well.

Figure 2:
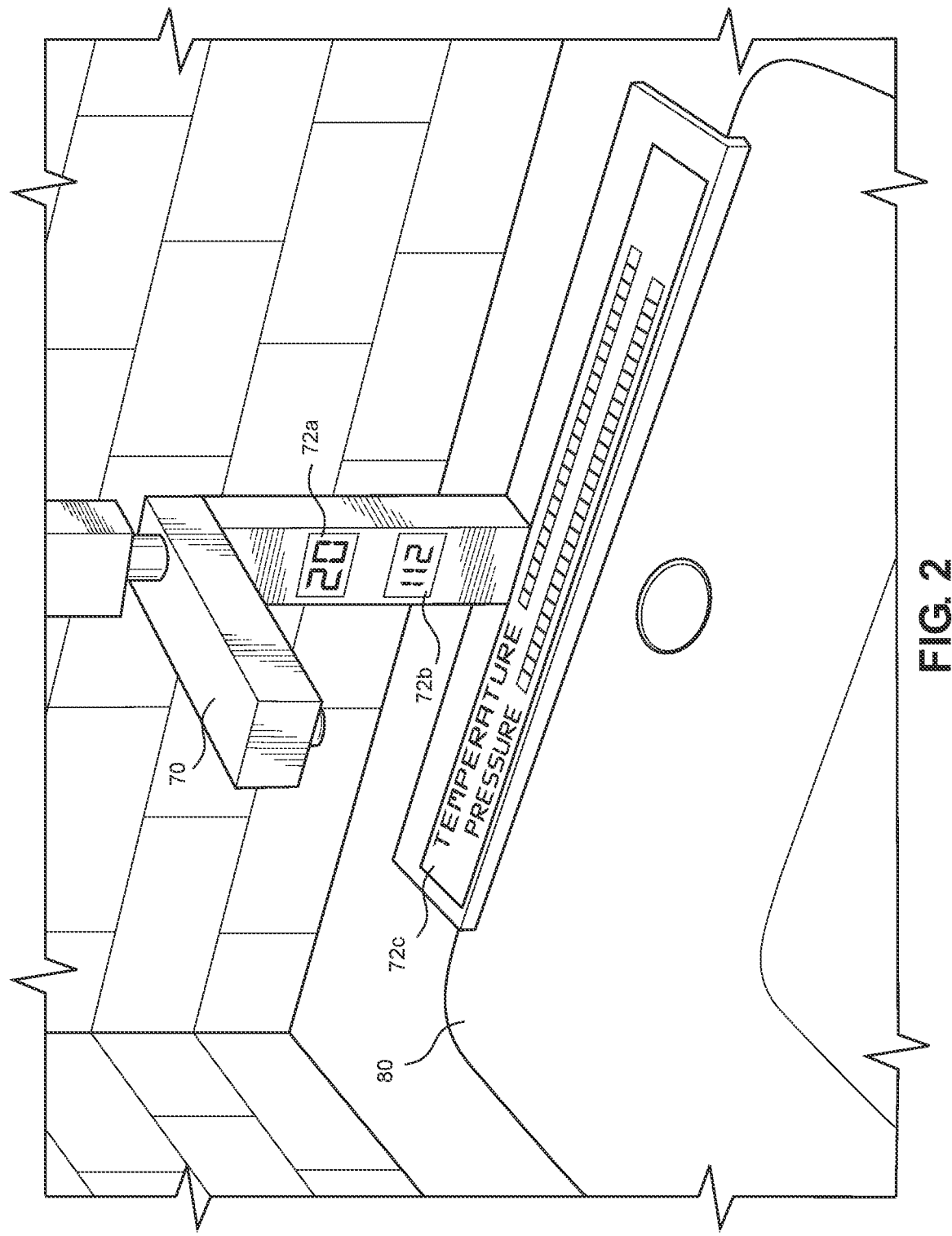
FIG. 2 shows a perspective view of an example bathtub faucet from an embodiment of the wireless water control system.

Referring now to FIG. 2, there is shown a bathtub faucet from an embodiment of the wireless water control system. The present invention can include many different types of faucets and water outlets. In this example, the faucet 70 can be positioned in a bathtub or shower 80. The display includes a graphical display 72c that is configured to graphically represent the strength of the water pressure and the temperature of the water emitted from the outlet faucet. The display screens also include a current temperature 72b and time remaining 72a screen which help users quantify their personal preferences and monitor for any issues while using the bath or shower.

As an example use of the present invention, an individual may have different temperature and pressure profiles stored on their external device. For example, an individual may in the morning desire a bath or shower that is a short duration and a high pressure to help them wake up. They may in contrast desire a nighttime bath or shower that is a long duration and a lower pressure to help them fall asleep. Individual users can have different profiles programmed in their external device to allow them to select between different flow rate, temperature, and duration combinations. The flow adjustment mechanism of the outlet faucet is configured to vary the output pressure of the water over the duration of the flow time. For example, the user can start the shower with higher pressure and end it with lower pressure, or have any other combination of time varying pressure and temperature that they desire. The flow adjustment mechanism of the outlet faucet is configured to vary the temperature of the water over the duration of the flow time by adjusting the output of the hot and cold water lines.

Figure 3:
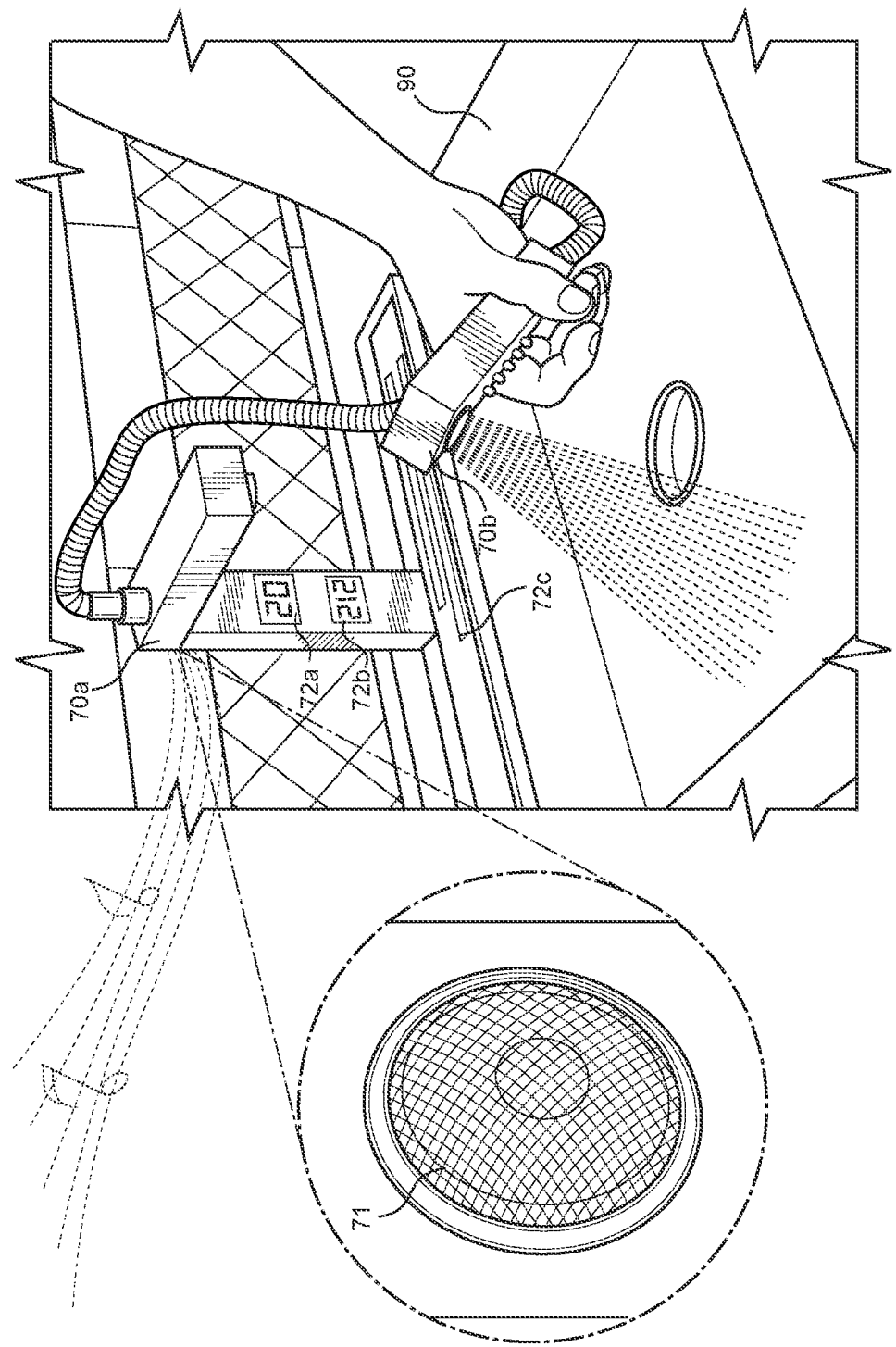
FIG. 3 shows a perspective view of an example sink faucet from an embodiment of the wireless water control system.

Referring now to FIG. 3, there is shown a sink faucet from an embodiment of the wireless water control system. In this example, the water outlet is a sink faucet 70a within a sink 90, and includes a handheld water wand 70b for additional convenience. A microphone and speaker 71 is included with the faucet. The external device is configured to wirelessly transmit audio information to the speaker 71 via the wireless network. In order to provide effective timing for brushing teeth, washing hands, or other hygiene tasks, the speaker is configured to emit audio for the duration of the flow time. For example, the user can play a clip of a song or other audio file that lasts for the two minutes recommended for teeth brushing. This helps users enjoy and complete the task as needed. The timing of the music can also correspond to the amount of time needed to effectively wash the hands to eliminate germs. As described above, the microphone and speaker can be utilized in conjunction with the text-to-speech mechanisms of the control circuit to convey information received from internet searches, calendar reminders, or other functions. Further, the speaker 71 can emit any audio from the connected external device, such as music, text-to-speech information from the internet, or other sources.

In conclusion, the present invention provides a system that wirelessly alerts or notifies users of various events within the water system of a building. Such alerts may include, but are not limited to, water usage alerts, water pipe temperature alerts, water heater malfunction alerts, pipe leak alerts, and the like. Further, the system allows users to program their user parameters for different outlet faucets and different personal preferences, such as water pressure, water temperature, water duration, and the like. In this way, the present invention improves upon existing water systems by providing wireless event notification and automated control options for many different types of outlet faucets.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention. Therefore, the foregoing is considered as illustrative only of the principles of the invention. Further, it is not desired to limit the invention to the exact construction and operation shown and described, and accordingly, all suitable modifications and equivalents may be resorted to, falling within the scope of the invention.

I claim:
1. A wireless water control system, comprising:
a water heater operably connected to a water supply;
a water line sensor device operably connected to a water line that is in fluid communication with the water heater, the water line sensor device including a pressure sensor, a leak detection sensor, a temperature sensor, a wireless transceiver, and a power source;
a wireless flow control valve operably connected to the water line;
an outlet faucet in fluid communication with the water line, the outlet faucet comprising a microphone, a speaker, a display screen, a power source, a wireless transceiver, a flow adjustment mechanism, a flow rate sensor, and a temperature sensor;
wherein the outlet faucet, the control circuit, the water line sensor device, and the wireless flow control valve are in wireless communication via a shared wireless network;
a control circuit operably connected to the water heater, the control circuit comprising a wireless transceiver, a processer, a non-transitory computer readable medium operatively connected to the processor, and a logic stored in the non-transitory computer readable medium that, when executed by the processor, causes the stroller to perform a method, the method comprising:
receiving user information comprising one or more parameters from an external device via the wireless network, the one more parameters comprising a flow rate, a flow pressure, a flow temperature, and a flow time; and
activating the outlet faucet via a command control through the wireless network, wherein the outlet faucet emits water at a flow rate, a flow pressure, a flow temperature, and for a flow time according to the user information;
wherein the outlet faucet is a bathtub faucet or a shower faucet attached to a bathtub or a shower;
wherein the outlet faucet is an outdoor faucet that receives a garden hose connection;
wherein the method further comprises: if the temperature sensor of the water line sensor device detects a temperature outside of an acceptable temperature range, then automatically activating or deactivating the heating mechanism of the water heater to bring the water temperature within the acceptable temperature range;
wherein the control circuit includes a wired connection to the water heater;
wherein the water heater includes a float valve; and
wherein the method further comprises: if the water heater float sensor detects a level outside of an acceptable water level range, then closing the wireless flow control valve and transmitting a notification to the external device.

2. The wireless water control system of claim 1, wherein the outlet faucet is a sink faucet attached to a sink.

3. The wireless water control system of claim 1, wherein the method further comprises: if the leak detection sensor of the water line sensor device detects a leak, then transmitting a notification to the external device and closing the wireless flow control valve.

4. The wireless water control system of claim 1, wherein the method further comprises: if the outlet faucet's flow rate sensor detects a flow of water above a threshold amount, then sending a notification to the external device.

5. The wireless water control system of claim 1, wherein the speaker is configured to emit audio for the duration of the flow time.

6. The wireless water control system of claim 5, wherein the external device is configured to wirelessly transmit audio information to the speaker via the wireless network.

7. The wireless water control system of claim 1, wherein the flow adjustment mechanism of the outlet faucet is configured to vary the output pressure of the water over the duration of the flow time.

8. The wireless water control system of claim 1, wherein the flow adjustment mechanism of the outlet faucet is configured to vary the temperature of the water over the duration of the flow time.

9. The wireless water control system of claim 1, wherein the outlet device display comprises a graphical display that is configured to graphically represent the strength of the water pressure and the temperature of the water emitted from the outlet faucet.

10. The wireless water control system of claim 1, wherein the water line sensor device power source comprises a rechargeable battery.

11. The wireless water control system of claim 1, wherein the method further comprising: receiving, via the microphone of the outlet faucet, a voice command analyzing the voice command via a voice activation mechanism of the logic stored on the memory; receiving information via the wireless network; analyzing the information via a text-to-speech mechanism of the logic stored on the memory; and emitting the information as speech via the speaker of the outlet faucet.

* * * * *